United States Patent [19] [11] 3,688,003
Kurtz et al. [45] Aug. 29, 1972

[54] PROCESS FOR THE CONTINUOUS PRODUCTION OF 1,4-DICYANO-2-BUTENE

[72] Inventors: Peter Kurtz, Leverkusen; Herbert Schwarz, Opladen, both of Germany

[73] Assignee: Farbenfabriken Bayer Aktiengesellschaft, 3, Leverkusen, Germany

[22] Filed: Sept. 21, 1970

[21] Appl. No.: 73,750

[30] Foreign Application Priority Data

Sept. 25, 1969 Germany..........P 19 48 460.7

[52] U.S. Cl. .........................................260/465.8 R
[51] Int. Cl. ............................................C07c 121/20
[58] Field of Search................................260/465.8 R

[56] References Cited

UNITED STATES PATENTS

| | | |
|---|---|---|
| 3,557,187 | 1/1971 | Weitz et al...........260/465.8 R |
| 2,448,755 | 9/1948 | Zellner.................260/465.8 R |
| 2,518,608 | 8/1950 | Farlow.................260/465.8 R |
| 2,477,597 | 8/1949 | Hager...................260/465.8 R |
| 2,477,617 | 8/1949 | Johnson...............260/465.8 R |
| 2,477,674 | 8/1949 | Whitman.............260/465.8 R |

*Primary Examiner*—Joseph P. Brust
*Attorney*—Plumley & Tyner

[57] ABSTRACT

Continuous process for the production of 1,4-dicyano-2-butene wherein 1,4-dichloro-2-butene and/or 1,2-dichloro-3-butene are reacted with hydrocyanic acid in the presence of copper-I-salts, said reacting being effected so that dichloro-butene is continuously introduced into the first vessel of the cascade while an aqueous sodium cyanide solution containing a copper-I-salt is continuously introduced into each vessel of the cascade.

5 Claims, 1 Drawing Figure

PATENTED AUG 29 1972                    3,688,003
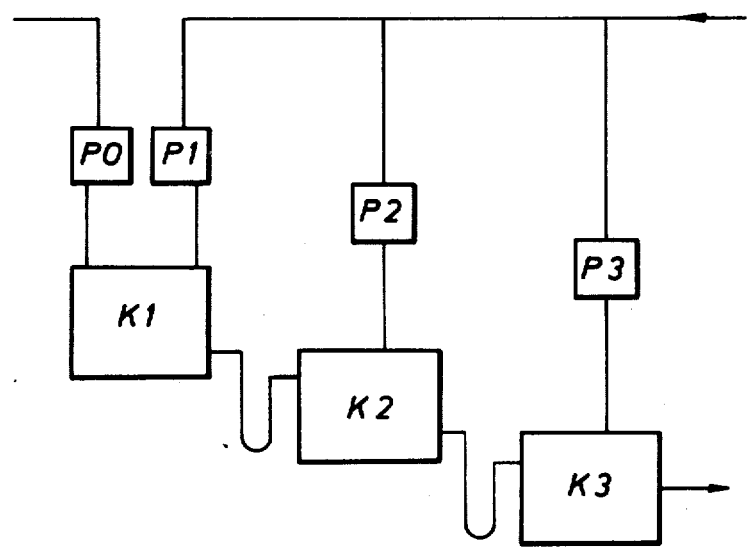
INVENTOR.
PETER KURTZ   HERBERT JOHN ARE
BY
Plumley & Tyner

PROCESS FOR THE CONTINUOUS PRODUCTION OF 1,4-DICYANO-2-BUTENE

This invention relates to a process for the continuous production of 1,4-dicyano-2-butene.

German Pat. specification No. 872,941 relates to a process for the production of 1,4-dicyano-2-butene (dihydromuconic acid dinitrile), in which hydrocyanic acid, optionally in the form of an alkali metal or an alkaline earth metal cyanide, is allowed to act on 1,4-dichloro-2-butene at a temperature of 80° C in the presence of a copper-I-salt to avoid a strongly alkaline reaction. Precautions are taken to ensure that the hydrochloric acid formed is removed from the reaction mixture as it is formed, optionally through chemical binding (see also U.S. Pat. specification No. 2,477,672).

German Pat. specification No. 878,942 relates to a process for the production of the same unsaturated 1,4-dinitrile in which pure 1,2-dichloro-3-butene or a mixture of 1,4Ann. with 1,2-dichloro butene is used as the starting material instead of pure 1,4-dichloro-2-butene.

The process is carried out as follows: one of the pure dichlorobutenes or a mixture of the two is added dropwise from a supply vessel over a period of several hours to a suspension of copper-I-chloride in a saturated sodium chloride solution to which copper powder is added to reduce any copper-II-ions present and which is then acidified with a small quantity of concentrated hydrochloric acid. An aqueous solution of sodium cyanide is added dropwise from another supply vessel so that the dichlorobutane is always present in an excess in the reaction vessel and so that the reaction mixture remains acid.

Subsequently, the process was improved through maintaining a pH value of from 3 to 4 by continuous measurement of the pH value of the contents of the vessel (P. Kurtz, Liebigs Ann. Chem. 631, 21 – 56(1960), pages 40 and 41).

Addition of the sodium cyanide solution is regulated by the pH value so that the supply is throttled in the event of a rise in the pH value and increased in the event of a fall in the pH. Accordingly, the quantity of the sodium cyanide solution added to the reaction zone per unit of time is governed by the particular test conditions.

The reaction is over when a further addition of sodium cyanide allows the pH to rise to a value above 4. Once this value has been reached, the reaction mixture is processes.

For example, the oil floating on the aqueous layer is extracted with toluene. The toluene solution is filtered and concentrated through evaporation. The crude 1,4-dicyano-2-butene left as a residue is distilled.

Accordingly, two phases are always present in the process for the production of 1,4-dicyano-2-butene: the oily phase of the dichlorobutene or, after its reaction, of the dinitrile, and the aqueous sodium chloride solution in which the catalyst (copper-I-salt) is present in suspension or solution. Since the dichlorbutene must always be present in an excess in the reaction vessel, the end point of the reaction is not identical with the end point of the dichlorobutene addition, instead it is followed by a post-reaction period in which only sodium cyanide solution is added until, as already described, the pH rises to a value above 4.

Although in this process the two reaction products dichlorobutene and aqueous sodium cyanide solution are introduced into the vessel at a controlled rate per unit of time, the process cannot be carried out continuously on account of the unknown duration of the after reaction.

Unfortunately, the after reaction cannot be left out because considerable quantities of unreacted or partially reacted dichlorobutene are present in the reaction vessel on completion of the main reaction. These products show a tendency towards undesired secondary reactions and complicate purification of the 1,4-dicyano-2-butene. Their recovery would seriously affect the economy of the process. For economical reasons, however, it is desirable in the production of 1,4-dicyano-2-butene on an industrial scale to operate continuously rather than in batches.

It is an object of this invention to provide a process for the production of 1,4-dicyano-2-butene from dichlorobutene by the two-phase reaction described above, which can readily be carried out continuously.

This object is accomplished by a process for the continuous production of 1,4-dicyano-2-butene, which comprises continuously introducing 1,4-dichloro-2-butene, 1,2-dichloro-3-butene or a mixture of the two into the first vessel of a cascade consisting of a plurality of vessels, introducing continuously an aqueous sodium cyanide solution containing a cuprous salt into each vessel of said cascade, removing continuously the resulting reaction mixture from the last vessel of said cascade on completion of the reaction and processing in the conventional manner.

The rate at which the dichlorobutene is added is governed by the reaction velocity. It has proved to be unfavorable to add all the dichlorobutene at once and only to add the sodium cyanide solution dropwise as it is consumed. The basically desirable excess of dichlorobutene should not exceed the quantity which is reacted per unit of time because the yield of 1,4-dicyano-2-butene is reduced through secondary reactions involving the dichlorobutene, for example hydrolysis into butene diol.

As already mentioned, it was known that the reaction can be catalysed by the addition of small quantities of a copper-I-salt. Systematic investigations into the composition of the catalyst in dependence upon the pH value of the aqueous phase have shown that the following compound:

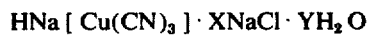

or the ion:

is present at the value in the acid range (pH 3 to 4) previously determined as the optimum value (P. Kurtz, Liebigs Ann. Chem. 631, page 25).

Where the process is carried out continuously, the copper-I-chloride is now added to the sodium cyanide solution in a quantity of from 10 to about 0.5 percent by weight, based on the solid sodium cyanide. The copper salt dissolves in the aqueous sodium cyanide solution in accordance with the following equation:

$$CuCl + (NaCN)_x \cdot YH_2O \rightarrow$$
$$NaCl + Na_{x-1}[Cu(CN)_x] \cdot YH_2O$$

In contrast to batch procedure, the concentration of the catalytically active cuprous compound is kept constant in this way in the continuous embodiment. It has been found that this measure leads to a slight increase in the yield of 1,4-dicyano-2-butene.

The following basically obvious conditions were maintained during investigations into the kinetics involved in the reaction of dichlorobutene with hydrocyanic acid (or sodium cyanide) to form 1,4-dicyano-2-butene:

1. Vigorous mixing of the two-phase system.
2. Maintaining a constant reaction temperature by dissipating the heat of reaction.

If these conditions are maintained in batch procedure, the reaction takes place very quickly with up to a 90 percent conversion. If, for example, the main reaction takes approximately 75 minutes, at least 15 minutes and better still 30 minutes are required for the secondary reaction (cf. Comparison test).

Similar results are obtained in cases where, although the process is carried out continuously in a cascade apparatus, the reaction components are both introduced into the first vessel of the cascade.

Surprisingly, it has now been found that the yield of 1,4-dicyanobutene can be increased by from 10 to 15 percent (i.e., from 80 percent to between 90 and 95 percent of the theoretical) provided that, in cases where the reaction is carried out continuously in a cascade apparatus of suitable size by the process according to the invention, addition of the sodium cyanide solution is distributed among each of the individual vessels in the cascade and the supply regulated by measuring the pH value which is automatically adjusted through the test conditions prevailing in each of the vessels.

The continuous process carried out in this way not only produces an increase in yield but it can also be carried out in a much smaller apparatus than can the batch process.

These two factors have a favorable effect upon the economy of 1,4-dicyano-2-butene production. As already known, 1,4-dicyano-2-butene is an initial stage in the production of 1,6-diaminohexane which is used as a starting material for the production of polyamides and polyurethanes.

Although it is mentioned in U.S. Pat. specification No. 2,477,573 that the reaction of dichlorobutene with hydrocyanic acid which leads to 1,4-dicyano-2-butene can be carried out continuously, it is also mentioned that it is desirable to introduce the hydrogen chloride acceptor at more than one point of the reaction vessel. Unfortunately, these measures alone are not sufficient to optimize the process especially since there are no detailed particulars of the conditions.

The following examples are to further illustrate the invention without limiting it.

COMPARISON EXAMPLE

One thousand g of a mixture of 39.7 percent of 1,2-dichloro-3-butene, 1.5 percent of cis- and 57.0 percent of trans-1,4-dichloro-2-butene (the remainder of 1.8 percent being impurities) are run in with vigorous stirring over a period of 75 minutes at 80° to 81° 97°C to a talyst solution which has been prepared from 500 ml of a saturated sodium chloride solution, 500 ml of water, 1. g of copper-I-chloride, 20 ml of concentrated hydrochloric acid and which has been adjusted to a pH value of 3.5 by the addition of 90 ml of an approximately 30 percent aqueous sodium cyanide solution.

Accordingly, the supply rate which is kept constant over this period amounts to 13.34 g/min.

In the meantime, an approximately 30 percent aqueous sodium cyanide solution is added in such a quantity that a pH value of substantially 3.5 (3.0 to 4.5) is maintained in the reaction vessel.

The content of crude 1,4-dicyano-2-butene (i.e., still containing secondary products) is analytically determined at regular intervals. The results obtained are set out in the following table:

| Time | Dichloro butene g | NaCN solution approx. 30% g | 1,4-Dicyano-2-butene Calc. pure product g | Found crude product g | % of the theoretical |
|---|---|---|---|---|---|
| — | — | — | — | — | — |
| 15 | 188 | 540 | 159 | 118 | 74 |
| 25 | 131 330 | 945 | 280 | 248 | 88 |
| 35 | 470 | 1360 | 298 | 346 | 87 |
| 45 | 600 | 1750 | 518 | 504 | 97 |
| 55 | 740 | 2160 | 627 | 550 | 88 |
| 65 | 860 | 2580 | 730 | 696 | 95 |
| 75 | 1000 | 2940 | 850 | 800 | 94 |
| 85 | | 3060 | | | |
| 95 | 105 | 3090 | | 820 | 96.5 |

The addition of dichlorobutene takes 75 minutes, although the test itself lasts for 105 minutes. After distillation, the end yield of pure 1,4-dicyanobutene comprises approximately 90 percent.

When the test is interrupted after 75 minutes, small quantities of the unreacted dichlorobutene are still present in the reaction vessel. Without any further addition of NaCN solution these form hydrogen chloride through the hydorlyses. The result is a decrease in the pH value to below 1. This gives rise to secondary reactions, including, in particular, hydrolysis of the nitrile groups of the 1,4-dicyano-2-butene and hence to a reduction in the yield of the required product.

During the after reaction, which lasts for 30 minutes, 150 g of the aqueous sodium cyanide solution are gradually added to the mixture. When this quantity is added all at once, the pH value rises to above 4 after the 75th minute. This results in resin formation and in a darkening of the color of the reaction mixture.

EXAMPLE

As shown in the accompanying drawing, the apparatus consists of the reaction vessels K1 K2, K3 and the associated pumps for sodium cyanide solution P1, P2, P3 and the pump p0 for dichlorobutene. Each vessel has an effective capacity of approximately 23 liters and is provided with a cooling coil for dissipating the heat of reaction, a reflux condenser which is vented in a nitrogen-filled gasometer, a high-speed stirrer, a pH gauge and the associated delivery and discharge pipes.

To start the process, the vessels are filled with a saturated sodium chloride solution and heated to about 80°

C. 4.9 kg of a mixture of approximately 30 percent of 3,4-dichloro1-butene, 68 percent of 1,4-dichloro-2-butene and approximately 2 percent of non-reacting impurities are pumped with vigorous stirring into the first vessel through P0.4 At the same time, a sodium cyanide solution of the following composition begins to be pumped into the first vessel through P1:

| | |
|---|---|
| sodium cyanide | 1000.0 parts by weight |
| water | 3660.0 parts by weight |
| copper-I-chloride | 1.4 parts by weight |

The rate at which the sodium cyanide solution is pumped in is governed by the pH value which is kept at 3.8. As the pH rises, the output of the pump decreases and vice versa. After a short time, the pH value in the second vessel begins to fall so that sodium cyanide solution is now pumped into this vessel too through P2. A similar procedure is adopted in the third vessel. After a few hours, a stationery condition prevails in all the three vessels to which the following pumping rates correspond:

Vessel 1
| | | |
|---|---|---|
| Dichlorobutene | 4.9 kg/h | corresponding to 4800 g of pure dichlorobutene |
| Sodium cyanide solution | 11.4 kg/h | corresponding to 2439 g of NaCN |

Vessel 2
| | | |
|---|---|---|
| Supply from vessel 1 | 16.3 kg/h | |
| Sodium cyanide solution | 3.9 kg/h | corresponding to 834 g of NaCN |

Vessel 3
| | | |
|---|---|---|
| Supply from vessel 2 | 20.2 kg/h | |
| Sodium cyanide solution | 2.0 kg/h | corresponding to 428 g of NaCN. |

Accordingly, a total of 3,701 g/hour of sodium cyanide is reacted, corresponding to 96 percent of the theoretical. 21.2 kg/h of the reaction liquid containing 3,870 g/hour of 1,4-dicyano-2-butene (corresponding to a yield of 95 percent of the theoretical) in addition to sodium chloride, copper-I-salts and secondary products, flow off from the third vessel.

What we claim is:

1. A process for the continuous production of 1,4 dicyano-2-butene, which comprises continuously introducing 1,4-dichloro-2-butene, 1,2-dichloro-3-butene or a mixture of the two into the first vessel of a cascade consisting of a plurality of vessels, introducing continuously into each vessel of said cascade an aqueous solution consisting essentially of a sodium cyanide solution containing 0.5–10 percent by weight of a copper-I-salt based on the solid sodium cyanide, the amount of dichlorobutene being continuously introduced to said vessel being such that it does not exceed the amount reacting with the sodium cyanide per unit time and the introduction of said aqueous sodium cyanide into each individual vessel of the cascade being separately regulated by maintaining a pH of from 3 to 4 in each vessel; removing continuously the resulting reaction mixture from the last vessel of the cascade on completion of the reaction and recovering the 1,4-dicyano-2-butene.

2. The process of claim 1 wherein said continuous process is carried out at a temperature of about 80° C.

3. The process of claim 2 wherein said copper-I-salt is copper-I-chloride.

4. The process of claim 2 wherein said continuous process is carried out in three cascade vessels.

5. In a process for the production of 1,4-dicyano-2-butene by reacting 1,4-dichloro-2-butene, 1,2-dichloro-3-butene or a mixture of the two with an aqueous solution of sodium cyanide in the presence of a copper-I-salt catalyst at a pH of about 3–4, the improvement which comprises continuously introducing the dichlorobutene into the first of a plurality of vessels of a cascade and also continuously introducing into each vessel of the cascade an aqueous solution consisting essentially of a sodium cyanide solution containing 0.5–10 percent by weight of said copper-I-salt catalyst, based on the solid sodium cyanide, the amount of dichlorobutene being continuously introduced to said vessel being such that it does not exceed the amount reacting with the sodium cyanide per unit time and the introduction of said aqueous sodium cyanide into each individual vessel of the cascade being separately regulated by maintaining the pH at 3–4 in each vessel.

* * * * *

UNITED STATES PATENT OFFICE
CERTIFICATE OF CORRECTION

Patent No. 3,688,003    Dated August 29, 1972

Inventor(s) Peter Kurtz et al

It is certified that error appears in the above-identified patent and that said Letters Patent are hereby corrected as shown below:

Column 1, line 21, "1,4 Ann." should read ---1,4--.

Column 1, line 51, "processes" should read --processed--.

Column 4, line 1, "97" should be deleted.

Column 4, line 2, "ca" should be inserted before "talyst".

Column 4, line 4, "1.g" should read ---10g---.

Column 4, In The Table, "131" should be deleted.

Column 4, In The Table, the line "105 3090 820 96.5" should be one line lower.

Signed and sealed this 26th day of November 1974.

(SEAL)
Attest:

McCOY M. GIBSON JR.
Attesting Officer

C. MARSHALL DANN
Commissioner of Patents